W. N. PARKES.
ROTARY HOOK SEWING MACHINE.
APPLICATION FILED MAY 2, 1914.

1,188,818.

Patented June 27, 1916.
3 SHEETS—SHEET 2.

WITNESSES:
J.B. McGirr.
L.E. Fischer.

INVENTOR
William N. Parkes
BY
Henry J. Miller
ATTORNEY

W. N. PARKES.
ROTARY HOOK SEWING MACHINE.
APPLICATION FILED MAY 2, 1914.

1,188,818.

Patented June 27, 1916.
3 SHEETS—SHEET 3.

WITNESSES:
J. B. McGirr.
L. E. Fischer.

INVENTOR
William N. Parkes
BY
Henry J. Miller
ATTORNEY

UNITED STATES PATENT OFFICE.

WILLIAM N. PARKES, OF BROOKLYN, NEW YORK, ASSIGNOR TO THE SINGER MANUFACTURING COMPANY, A CORPORATION OF NEW JERSEY.

ROTARY-HOOK SEWING-MACHINE.

1,188,818.  Specification of Letters Patent.  Patented June 27, 1916.

Application filed May 2, 1914. Serial No. 835,843.

*To all whom it may concern:*

Be it known that I, WILLIAM N. PARKES, a citizen of the United States, residing at Brooklyn, in the county of Kings and State of New York, have invented certain new and useful Improvements in Rotary-Hook Sewing-Machines, of which the following is a specification, reference being had therein to the accompanying drawings.

This invention relates to lock-stitch sewing machines, and more particularly of that type disclosed in my United States Patent No. 730,692, of June 9, 1903. According to said patent, the loop-seizing hook and the bobbin-case are constructed to accommodate a mass of lower thread of maximum size with the ordinary amount of needle-thread loop distention, with the result of producing a lower thread capacity greatly exceeding that of other lock-stitch loop-taker mechanisms in conjunction with take-up mechanism of the same capacity or range of action. This increased bobbin capacity may be therefore secured without any additional reeving of the needle-thread through the needle-eye in the loop-distending and take-up actions of the successive stitch-forming cycles.

As disclosed in said patent, the loop-seizing hook is adapted for rotary movement only upon an axis substantially parallel with the reciprocating needle, and the primary object of the present invention is to provide a loop-taker having the advantages of the same but capable of embodiment in various classes of sewing machines, and particularly those provided with a loop-taker actuating shaft disposed transverse to the needle-path, or parallel with the work-supporting plate.

It has for a further object to effect the delivery of the needle-thread loop from the loop-taker after a loop-casting operation so as to insure freedom from kinks and twists, and to thus prevent the formation of loose loops upon the under face of the work after the completion of the stitches.

In the preferred form of the improvement, the rotary loop-seizing member is formed with an axial thread-cavity and is provided with a beak having its point at the extreme forward end of said member and its throat disposed intermediate the ends of the thread-cavity and with an external loop-deflecting part extending into circumferential alinement with the point of the beak. The thread-case, journaled within the preferably cup-shaped loop-seizing member and restrained against movement therewith, has attached at or near its bottom or rearward end a loop-distending beak entering an annular channel in the wall of the rotary member extending through said beak and lying across the path of movement of said throat.

In practice the beak of the hook may be formed by providing an inclined slot extending from the forward end of the hook-body to a position adjacent the bottom of the thread-case, a loop-stop being extended from the inclined loop-deflecting edge of the beak so as to form a throat therefor at the end of its operative portion intermediate the ends of the bobbin-case, while the remainder of the inclined slot affords clearance for the thread-loop drawn backwardly to the bottom of the thread-case by engagement with the loop-distending beak. The hook is constructed with a tail or loop-discharging point at its forward end directed oppositely to the beak, the intervening space being temporarily bridged over by a lateral loop-absorbing guard-flange formed upon the thread-case and overhanging the forward end of the hook-body. By this means, as the hook nears the completion of the first of its plural rotations during each needle-reciprocation, the thread-loop cast about the bobbin-case is drawn by the take-up off the beak and upon the tail of the hook from which it is subsequently released and drawn up into the work.

The loop-absorbing flange has preferably an upwardly extending discharge finger whose point enters a pocket in the bottom of the throat-plate which latter is formed with a loop-controlling spur inclined downwardly in the direction of motion of the loop-taker beak when performing its loop-seizing action. The thread-case has a second beak or projection circumferentially spaced from the loop-distending beak and working in the annular channel of the hook to prevent the premature release of the thread-loop from the loop-discharging point or tail of the hook. By the means thus described, in the initial loop-drawing action after the beak of the hook has reached cast-off position, the loop is drawn up over the loop-absorbing guard to insure it against twisting, and as it nears the throat-plate is received by the base of the discharge finger and the loop-controlling spur upon which it continues to be reduced in size, being gradually drawn off said spur and intermediate the point of the latter and the finger and finally drawn up through the throat-plate into the work over said finger.

The present invention will be understood by reference to the accompanying drawings, in which—

Fig. 2 is an end view of the lower portion of the machine upon a larger scale and with the bed-plate in transverse section. Figs. 3 and 4 are edge views of the thread-case with certain parts omitted and taken from different sides, and Fig. 5 a plan of the same. Figs. 6 and 7 are side views of the loop-taker complete, showing the thread-loops in different stages of the stitch-forming cycle. Figs. 8 and 9 are sectional views respectively, of the bobbin and thread-case, Fig. 10 a side view, partly in section, of the loop-seizing member, Fig. 11 an edge view of the disk or washer provided with the loop-distending and loop-detaining beaks, and Fig. 12 a sectional side view partly in section, of the loop-taker sustaining plate which is in practice secured in the forward end of the hook-shaft. Fig. 13 is a side view of the thread-case complete, and Fig. 14 a face view of the entire loop-taker, including the loop-seizing member and thread-case. Fig. 17 is a transverse sectional elevation of the loop-seizing member, showing the operative parts from the inside. Figs. 18 and 19 are respectively top and bottom plan views of the throat-plate, and Fig. 20 an edge view of the throat-plate with its loop-controlling spur and parts of the loop-taker coöperating therewith. Fig. 22 is a face view of one form of lower-thread tension-spring, and Fig. 23 a detail of the contact stud of said tension-spring. Fig. 24 is an edge view of an alternative form of tension-spring.

The present improvements are shown embodied in a Singer No. 61W machine constructed with a frame comprising the bed-plate 1 and overhanging bracket-arm 2 in which is journaled the main-shaft 3 which in practice has a driving connection with the reciprocating needle-bar 4 carrying the needle 5. The take-up is or may be of the "link" type comprising the vibratory take-up arm 6 operatively connected with the main-shaft as shown and described in the United States patent to W. F. Dial and G. H. Dimond No. 695,915, of March 25, 1902.

The main-shaft 3 is provided with a transversely grooved belt-wheel 7 connected by means of the transversely ribbed belt 8 with a similar belt-wheel 9 of smaller diameter journaled upon the stud 10 and having rigidly connected therewith the pinion 11 meshing with a similar pinion 12 fixed upon the hook-shaft 13 journaled beneath and longitudinally of the bed-plate 1. By the means thus described, the loop-taker shaft receives two rotations for each rotation of the main-shaft, and hence for each reciprocation of the needle.

Figure 15:
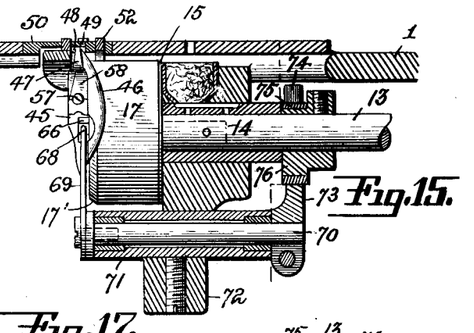
Fig. 15 is a sectional elevation of a portion of the work-plate, the loop-taker and means for restraining the thread-case against rotation.
Figure 16:
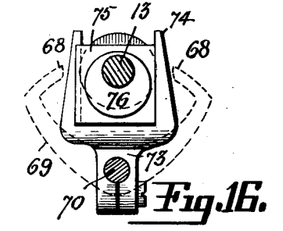
Fig. 16 is a detail view of the rotation-restraining means of the thread-case.

As represented in dotted lines in Fig. 15, the forward end of the hook-shaft 13 is formed with an axial socket in which is secured the pin 14 forming the stem of the loop-taker sustaining plate or disk 15 formed with the annular shouldered flange 16. The cylindrical body of the loop-seizing member is formed in its forward end with the concentric outer and inner shells 17 and 18 with an intermediate annular channel 19, the inner shell being laterally recessed in its forward portion to form the bobbin-case sustaining ledge or seat 20 of the axial thread-cavity inclosed by the inner shell 18. The inner wall of the hook-shell 17 is fitted at its rearward end to the supporting flange 16 to which it is secured by screws 21.

Figures 3, 4, 5, 6, 7, 8, 9, 10, 11, 12:
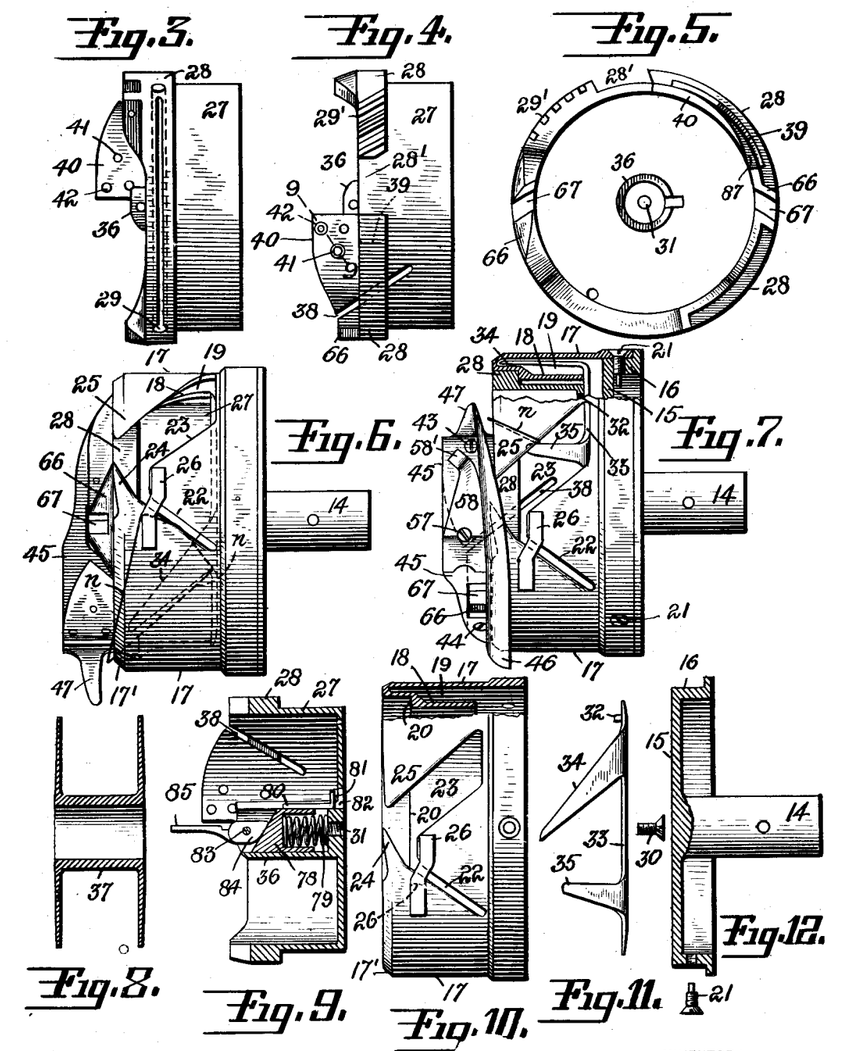
Figures 13, 14, 22, 24:
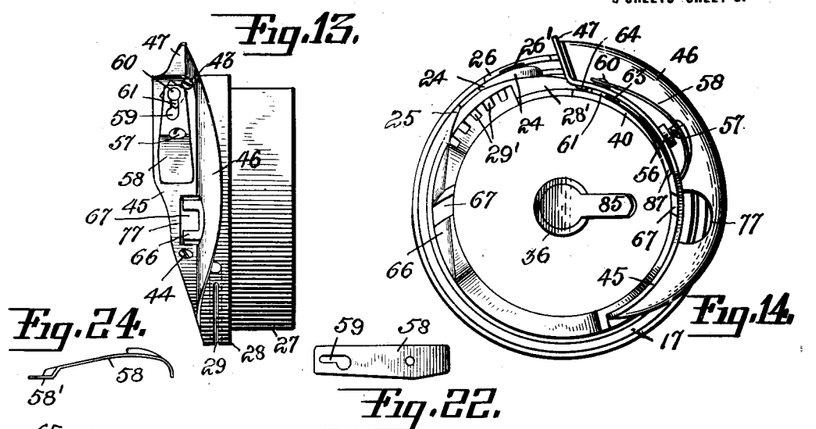

The hook-shell has in one side extending divergently from the forward end the inclined slots 22 and 23 forming respectively the loop-seizing beak 24 and the loop-discharging point or tail 25 whose points are disposed at the forward end of the loop-seizing member and are oppositely directed and slightly spaced apart circumferentially. Extending across the slot 22 intermediate its ends is the transverse bridge-piece 26 forming with the adjacent walls of the recess between the beak and tail a throat to receive one limb of the needle-thread loop seized by the beak 24. The bridge-piece 26 is cut out slightly in its inner face at 26' where it crosses the slot 22 to afford clearance for the thread-loop, as indicated in Figs. 6, 10 and 14. The forward edge of the outer hook-shell is peripherally beveled throughout nearly its circumference to afford a cast-off incline 17' having its discharge edge in circumferential alinement with the point of the beak by which the outer limb of a needle-thread loop engaged by the bridge-piece 26 is deflected over the end of the hook-body.

The body 27 of the thread-case is cylindrical in form with closed rearward end and provided adjacent its outer end with the annular flange 28 fitted to and journaled upon the ledge or seat 20 of the hook-shell, as indicated in Fig. 7. This flange is provided in one side with a segmental undercut groove 29 adapted to receive suitable packing material saturated with oil by means of which the bearing of the thread-case in the hook-body may be kept lubricated without the loss of lubricant by centrifugal action common to constructions in which the oil receptacle or cavity is disposed in the rotating part.

The flange 28 is discontinued for a small portion of the circumference at one side to form a recess or pocket 28' adjacent which it is provided with a peripheral series of narrow inclined slits 29' which in practice soon become packed with lint which absorbs lubricant from the surface of the flange and serves to distribute the same and maintain the operative surface properly lubricated in the continued use of the machine.

Secured rigidly to the bottom or rearward end of the thread-case by means of a screw 30, entering the threaded aperture 31 in the bottom of the thread-case, and the dowel-pin 32 which also enters a suitable aperture of the thread-case, is the disk or washer 33 with its outer portion seated upon the adjacent end of the inner hook-shell 18 by means of which the thread-case is confined in position within the thread-cavity of the hook with its flange 28 seated upon the supporting ledge 20 of the hook-body. The disk 33 has extending outwardly from its periphery the loop-distending beak 34 inclined relatively to the axis of movement in the opposite direction to the slot 22 and adjacent operative loop-distending edge of the beak 24; and circumferentially spaced from said beak 34 and projecting outwardly from the same face of the disk is the shorter loop-detaining beak or projection 35. Both of these projecting members 34 and 35 are arranged for operation within the annular channel 19 of the hook-body.

Sustained upon the bottom of the thread-case is the tubular axial bobbin-sustaining post 36 adapted to receive the tubular hub 37 of the disk-bobbin of well-known form from which the lower thread is led through the inclined delivery slit 38 in the wall of the bobbin-case, this slit being inclined oppositely to the hook-slot 22, as represented in Fig. 7. The bearing flange 28 is cut out at 39 where it crosses the thread-slit 38 adjacent the periphery of the thread-case to afford clearance for the thread issuing from said slit.

Forward of the flange 28 the thread-case has an extension 40 continuous with its body-portion across and to the outer edge of which the thread-slit 38 extends, as represented in Fig. 4, this extension being provided in its outer face near one extremity with the pockets 41 and 42. Upon this thread-case extension is secured by means of fastening screws 43 and 44 the segmental guard-member 45 having the angularly disposed curved loop-absorbing flange 46 extending laterally therefrom and overhanging the bearing flange 28 and the outer extremity of the hook-body, as represented more particularly in Fig. 7. The guard 45 has upon its inner face the boss 45' by means of which the surface of the guard is spaced slightly from the thread-case extension 40 to admit the thread. The loop-guard 45 terminates at one end in the substantially radial loop-discharging finger 47 into which the adjacent end of the flange 46 merges. The point of the finger 47 preferably enters a cavity 48 extending laterally from the needle-aperture 49 of the throat-plate 50 which is provided with the usual feed-dog apertures 51 entered by the serrated feed points 52 of the feed-dog 53 carried by the feed-bar 54 which is or may be actuated in any suitable or usual manner.

Figures 17, 19, 20:
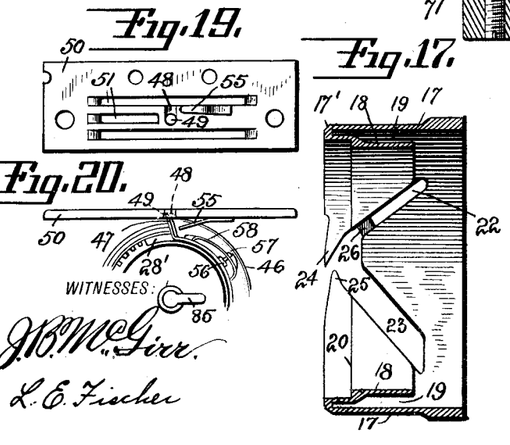
Figure 18:
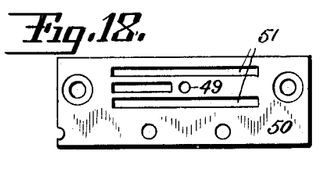
Figure 21:
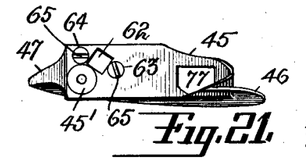
Fig. 21 is a detail view of the inner face of the loop-absorbing guard of the thread-case.

Depending from the bottom of the throat-plate is the downwardly inclined loop-controlling spur 55 extending in the direction of movement of the loop-taker beak and in the direction of feed toward and having its extremity spaced slightly from the loop-discharging finger 47, as represented particularly in Figs. 19 and 20. The form of this spur is not material excepting that its lower operative face should be inclined downwardly and its extremity should be directed to and spaced slightly from the part of the finger 47 intermediate the ends, so as to coöperate with such finger in receiving the needle-thread loop under the action of the take-up to insure its freedom from twists and its proper deposit upon the finger 47 preparatory to its final discharge therefrom in being drawn up into the fabric.

Figure 23:
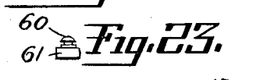

The guard 45 has upon its outer face the boss 56 having a threaded aperture entered by the tension-screw 57 which passes through an aperture in the arched tension-spring 58 with one extremity resting upon the guard 45 and the other provided with a key-hole slot 59. As represented in Figs. 13, 22 and 23, the slot 59 embraces the necked stud 60 of a contact block 61 passing through an aperture 62 of the guard 45 and normally resting upon the adjacent face of the thread-case extension 40 intermediate the pockets 41 and 42. The guard 45 has upon its inner face at opposite sides of the aperture 62 the studs or projections 63 and 64 with their extremities entering and slightly spaced from the bottoms of the pockets 41 and 42 and provided with the thread-guiding nicks or grooves 65 in angular arrangement so as to receive the under thread from the thread-slit 38 and direct the same across the aperture 62 beneath the tension-block 61 and upon the loop-discharging finger 47.

As represented more particularly in Figs. 20 and 24, the tension-spring 58 may have its operative end offset inwardly to form a contact element 58' in lieu of the block 61 for applying a drag upon the thread intermediate the guide-studs 63 and 64.

The outer end of the thread-case is provided with the forwardly projecting lugs 66 having the notches 67 which are entered by the concentrically arranged and opposed fingers 68 of the escapement yoke 69 fixed upon the forward end of the rock-shaft 70. This rock-shaft is suitably journaled in the bearing sleeve 71 of the bearing lug 72 depending from the bed-plate and has secured upon its opposite end the crank-arm 73 formed with the yoke 74 within which is fitted the slide-block 75 embracing the actuating eccentric 76 upon the hook-shaft 13.

The rocking yoke constitutes, in conjunction with the notched lugs 66, an escapement by means of which the thread-case is restrained against movement with the loop-seizing member in a manner well-known, the thread-case being engaged alternately by the fingers 68 of the yoke 69, which are successively retracted to permit the free passage of the needle-thread loop in the loop-casting operation. As represented in the drawings, the loop-guard 45 is formed with an opening 77 through which one of the yoke-fingers 68 moves in performing its function.

Figure 1:
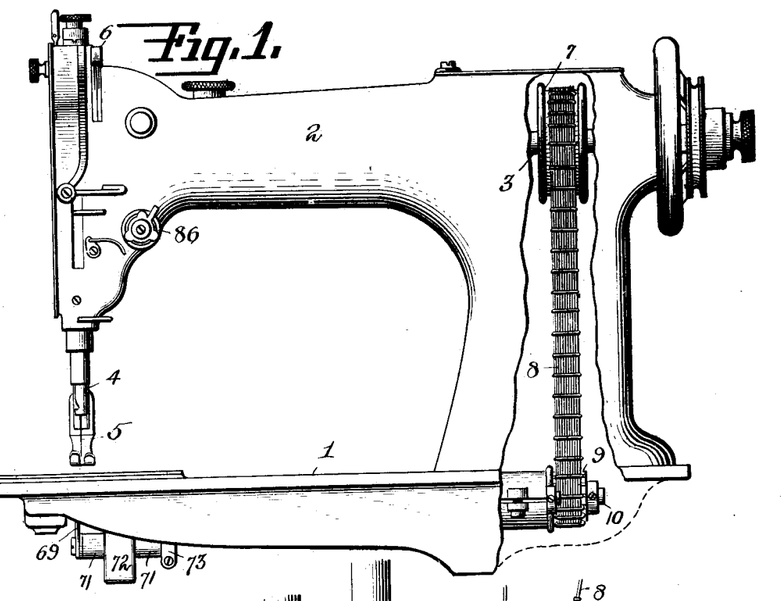
Figure 1 is an elevation of a sewing machine embodying the present improvement and Fig. 1ª is a detail view of the driving means for the loop-taker shaft.

As represented more particularly in Fig. 9, the tubular bobbin-supporting post 36 has slidingly fitted therein the plug 78 having an inclined forward end and provided in its opposite end with a socket embracing one end of a spring 79 whose opposite end rests upon the bottom of the thread-case. The plug 78 has secured to one side a spline or feather 80 entering a slot in and extending endwise of the post 36 and provided with a laterally extending bobbin-engaging stud 81 which is adapted to enter a radial slot 82 in the bottom of the thread-case. The post 36 has in its outer end a transverse fulcrum pin 83 upon which is mounted the cam-shaped hub portion 84 of the bobbin-confining finger-lever 85 which is normally turned into transverse relation with the post as represented in Fig. 1, in which position the cam-portion 84 presses the plug 78 backwardly in opposition to the spring 79 to maintain the ejecting lug 80 within the slot 82; but when the lever 85 is turned into releasing position, as represented in Fig. 9, the plug 78 is permitted to advance under the action of its spring 79, carrying with it the lug 81 whose engagement with the hub of the bobbin serves to eject the same sufficiently to be readily grasped by the operator.

In the use of the machine, the upper thread $n$ is led in the usual manner from the source of supply through various guides to the tension device 86 and thence through the usual aperture of the take-up arm 6 to the needle-eye. The bobbin having been inserted and locked within the thread-case, its thread $t$ is passed through the open end of the thread-slit 38 and under the apertured portion of the bearing flange 28 and through the taper passage 87 between the reduced wall of the thread-case extension 40 adjacent the threading slit 38 and the inner face of the guard 45. It is thence drawn beneath the rounded ends of the studs 63 and 64 and within their respective slots underneath the operative end of the tension-spring emerging from between the extremities of the parts 40 and 45 from which it is led upwardly over the face of the discharge-finger 47 adjacent its junction with the extremity of the guard-flange 46 from which it is led through the needle-hole of the throat-plate.

The needle having descended through the fabric and begun its rise, a loop is entered by the beak of the hook and upon its encounter with the loop-stop 26 is carried thereby toward the rear of the machine, or in the direction of feed, and downwardly from the throat-plate. Immediately after the encounter of the loop-stop by the outer limb of the thread-loop upon the beak just beyond the bobbin-case flange 28 intermediate the ends of the thread-cavity (Fig. 6), the inner limb of the thread-loop is engaged by the stationary loop-distending beak 34 which rapidly forces it backwardly along the clearance portion of the slot 22 to the lower face of the disk or washer 33. The outer limb of the thread-loop leading to the under face of the fabric in the meantime encounters the beveled cast-off part 17' of the outer hook-shell, which forces it over the forward edge of the hook, as represented in Fig. 6.

Figures 1A, 2:
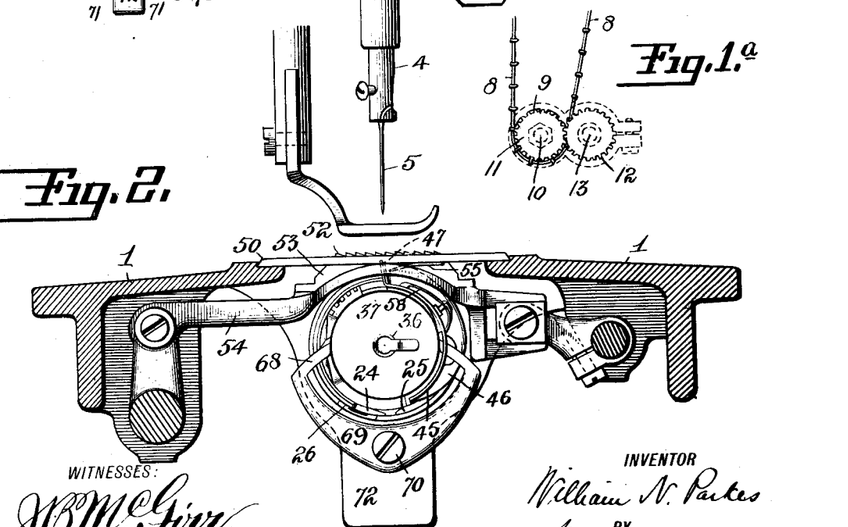

As the hook continues its rotation, the needle-thread loop thus distended is carried over the thread-case to cast-off position slightly beyond that represented in Fig. 2, at which point the take-up begins its operative movement. To prevent an excess of slack in the thread-loop in the period of action of the take-up, it is drawn over the loop-guard soon after leaving cast-off position, and as the take-up continues to act the loop is reduced and at the same time the loop guard-flange 46 acts as a bridge between the opposed points of the beak 24 and tail 25 for transfer of the thread-loop from the former to the latter, being detained in the throat of the latter adjacent the closed end of the thread-case. As the inner limb of the thread-loop remains confined between the loop-distending hook 34 and loop-detaining point 35 of the disk 33 rearward of the closed end of the bobbin-case, it remains trapped within the triangular space inclosed by the base of the hook-tail 25 and detainer 35 (Fig. 7) until the hook has substantially completed the initial rotation, when the retreat of the tail 25 from the detainer 35 opens a passage between them for release of the now greatly reduced thread-loop.

As the take-up action continues the thread-loop is drawn off the point of the tail around the discharge-finger 47 and adjacent portion of the flange 46 upon which it is yieldingly detained by the depending throat-plate spur 55 entering the angle between them. The continued contraction of the thread-loop causes it to be drawn under the point of the spur 55 and between it and the finger 47 and thus upwardly between the point of the discharge-finger and the recessed under face of the throat-plate from which it passes up into the fabric. It is to be understood that in the initial stage of the loop-casting action the rearward finger 68 of the escapement yoke is retracted from the thread-case to permit the loop to pass between them, and that during the subsequent take-up action such finger returns to engagement with the thread-case and the corresponding finger of the other arm of the yoke is retracted to release the thread-loop in the action thereon by the take-up.

As means are provided according to the present invention for forcibly restraining the outer limb of the needle-thread loop against being carried to the rearward portion of the hook-body and for deflecting it over the forward edge of the same while the inner limb of the thread-loop is forcibly distended rearward of the thread-cavity and the thread-case journaled therein, it will be seen that the present loop-taker is adapted for employment in machines wherein the loop-taker turns upon an axis transverse to the needle-path or horizontal as well as in machines wherein the axis of movement of the loop-taker is parallel with the needle-path or vertical.

While the improvement is specifically shown and described herein in a preferred embodiment, it will be observed that its various features are adapted for employment in different arrangements and combinations and are susceptible of individual modification both in form and construction within the scope of the present invention.

As will be observed, especially by reference to Fig. 6, one of the leading characteristics of the present loop-taker is the means whereby in the initial quadrant of rotation of the loop-seizing member a thread-loop is distended from a point intermediate the ends of the thread-case in opposite directions over the ends of the thread-case; the quick distention of the thread-loop thus avoiding its enlargement to any considerable degree by overlying the outer periphery of the hook preparatory to casting over the ends of the thread-case.

I wish it to be understood that each and all of the novel constructive features of the loop-taker and other thread-handling means herein shown and described are of my invention.

Having thus set forth the nature of the invention, what I claim herein is:—

1. A sewing machine loop-taker comprising a rotary loop-seizing member formed with a thread-cavity having a bearing shoulder adjacent one end and provided with a beak having its point at said end at one side of said shoulder and its throat adjacent and at the opposite side of said shoulder and with a cast-off part having its discharge edge extended into circumferential alinement with the point of said beak, a thread-case within and supported upon said bearing shoulder of the loop-seizing member, and a loop-distending beak restrained against rotation with said member and extending across the path of movement of said throat toward the bottom of the thread-cavity and adapted to engage one limb of a thread-loop seized by said beak and arrested thereon by said throat near said end of the loop-seizing member and to carry it to the bottom of the thread-case for the casting operation.

2. A sewing machine loop-taker comprising a rotary loop-seizing member formed with a thread-cavity having a bearing shoulder adjacent one end and provided with a beak having its point at said end at one side of said shoulder and its throat adjacent and at the opposite side of said shoulder and with a cast-off part having its discharge edge extended into circumferential alinement with the point of said beak, said member having formed within its wall an annular channel extending through said beak, a thread-case within and supported upon said bearing shoulder of the loop-seizing member, and a loop-distending beak restrained against rotation with said member and extending within said channel to a point intermediate said throat and said end of the loop-seizing member from the bottom of the thread-case and adapted to engage one limb of a thread-loop seized by said beak and arrested thereon by said throat near said end of the loop-seizing member and to carry it to the bottom of the thread-case for the casting operation.

3. In a sewing machine, the combination with a needle, of a cylindrical loop-seizing member movable upon an axis at an angle with said needle and having means for seizing a needle-thread loop at one of its extremities and distending it through a portion of the length of said member, and auxiliary spreading means for seizing said partially distended loop intermediate the ends of said member and completing its distention lengthwise of the latter, and a thread-case within said member over which said loop is cast.

4. A sewing machine loop-taker comprising a rotary loop-seizing member having an axial thread-cavity and a surrounding annular channel within its lateral wall and a loop-seizing beak entered by said channel and extending throughout substantially the depth of the thread-cavity, a loop-stop being applied to said beak intermediate its point and base and loop-deflecting means being provided upon said member intermediate said loop-stop and the end of said member adjacent the point of the beak, a thread-case within said loop-seizing member, and a loop-distending beak restrained against rotation with said member and extending across the path of movement of said loop-stop within said channel toward the bottom of the thread-cavity to a point adjacent the bottom of the thread-case.

5. A sewing machine loop-taker comprising a cup-shaped rotary loop-seizing member having an axial thread-cavity and a surrounding annular channel within its lateral wall and a circumferentially inclined slot extending through its wall across said channel substantially throughout the depth of the thread-cavity to form a loop-seizing beak, said member having a loop-stop crossing said slot to arrest one limb of a thread-loop seized by the beak, and means upon the exterior of said member for deflecting said limb of the thread-loop over the end of said member, a thread-case within said loop-seizing member, and a loop-distending beak restrained against rotation with said member and extending across the path of movement of said loop-stop within said channel toward the bottom of the thread-cavity to a point adjacent the bottom of the thread-case.

6. A cup-shaped loop-seizing member for sewing machines formed with an axial thread-cavity and a surrounding annular channel within its lateral wall and with a loop-seizing beak entered by said channel and extending throughout substantially the depth of the thread-cavity, a loop-stop attached to said beak close to its loop-distending edge and intermediate its point and base and nearer to the point than to the base of the beak to form a throat for arrest of the outer limb of a thread-loop upon the beak, and cast-off means intermediate said loop-stop and the end of the loop-seizing member adjacent the point of the beak.

7. A cup-shaped loop-seizing member for sewing machines formed with an axial thread-cavity and a surrounding annular channel within its lateral wall and having a circumferentially inclined slot extending through its wall across said channel substantially throughout the depth of the thread-cavity to form a loop-seizing beak, a loop-stop attached to the periphery of the hook-body close to and intermediate the ends of said slot and nearer to the point than to the base of the beak for arrest of the outer limb of a thread-loop upon the beak, and cast-off means upon the exterior of said member intermediate the loop-stop and the end of said member adjacent the point of the beak.

8. A cup-shaped loop-seizing member for sewing machines formed with an axial thread-cavity and a surrounding annular channel within its lateral wall and with a loop-seizing beak entered by said channel and extending throughout substantially the depth of the thread-cavity, the outer end of said member being provided with a peripherally inclined cast-off surface, and a loop-stop applied to said beak intermediate its point and base.

9. In a sewing machine, the combination with a reciprocating needle, of a loop-taker comprising a cup-shaped rotary loop-seizing member movable upon an axis transverse to said needle having an axial thread-cavity provided with an annular bearing shoulder and a surrounding annular channel within its lateral wall and a loop-seizing beak entered by said channel with its point in front of said bearing shoulder and its throat upon the opposite side of and close to said bearing shoulder, a thread-case journaled upon said bearing shoulder within the thread-cavity, and a loop-distending beak restrained against rotation with said member and extending across the path of movement of said throat toward the bottom of the thread-cavity to a point adjacent the bottom of the thread-case.

10. A sewing machine loop-taker comprising a cup-shaped rotary loop-seizing member having an axial thread-cavity provided with an annular bearing shoulder and a surrounding annular channel within its lateral wall and a loop-seizing beak entered by said channel with its point in front of said bearing shoulder and its throat upon the opposite side of and close to said bearing shoulder intermediate the ends of the thread-cavity, a thread-case journaled upon said bearing shoulder within the thread-cavity, and a loop-distending beak sustained by said thread-case and extending from the bottom of the latter across the path of movement of said throat.

11. A loop-seizing member for sewing machines constructed with oppositely directed loop-seizing beak and loop-discharging tail with their points circumferentially spaced apart, and means restrained against movement with said member for temporarily bridging said points for transfer of the loop from one to the other.

12. A sewing machine loop-taker comprising a loop-seizing member constructed with oppositely directed loop-seizing beak and loop-discharging tail formed with a circumferential channel intermediate their inner and outer faces and having their points circumferentially spaced apart, means restrained against movement with said member for temporarily bridging said points for transfer of the loop from one to the other, and means embraced by said channel for detaining the thread-loop upon the tail of the loop-seizing member.

13. A sewing machine loop-taker comprising a loop-seizing member constructed with oppositely directed loop-seizing beak and loop-discharging tail formed with a circumferential channel intermediate their inner and outer faces and having their points circumferentially spaced apart, means restrained against movement with said member for temporarily bridging said points for transfer of the loop from one to the other, means operating in said channel for distending a thread-loop seized by said beak, and means also operating in said channel for detaining said thread-loop upon the tail of the loop-seizing member after transfer thereto from said beak.

14. A sewing machine loop-taker comprising a loop-seizing member constructed with oppositely directed loop-seizing beak and loop-discharging tail formed with a circumferential channel intermediate their inner and outer faces and having their points circumferentially spaced apart, means restrained against movement with said member for temporarily bridging said points for transfer of the loop from one to the other, a thread-case journaled in said loop-taking member, a loop-distending beak sustained by said thread-case and entering said channel for coöperation with the beak of said member, and a loop-detaining finger also sustained by the thread-case and entering said channel for coaction with the tail of said member.

15. A sewing machine loop-taker comprising a loop-seizing member constructed with oppositely directed loop-seizing beak and loop-discharging tail formed with a circumferential channel intermediate their inner and outer faces and having their points circumferentially spaced apart, means restrained against movement with said member for temporarily bridging said points for transfer of the loop from one to the other, a thread-case journaled in said loop-taking member, and a disk secured to the bottom of said thread-case and provided with circumferentially spaced loop-distending beak and loop-detaining finger entering said channel and coöperating respectively with the beak and tail of said member in distending a thread-loop and detaining the same in a loop-casting operation.

16. A loop-seizing member for sewing machines constructed with oppositely directed loop-seizing beak and loop-discharging tail with their points circumferentially spaced apart, and a thread-case journaled in said member and provided with a loop-guard overhanging the paths of movement of said beak and tail.

17. In a sewing machine, the combination with a loop-seizing member constructed with oppositely directed loop-seizing beak and loop-discharging tail with their points circumferentially spaced apart, and a stationary thread-case journaled in said member and provided with a loop-guard overhanging the paths of movement of said beak and tail, of a stationary loop-controller sustained independently of and adjacent an extremity of said loop-guard and coöperating therewith in the discharge of the loop from said guard.

18. In a sewing machine, the combination with a loop-seizing member constructed with oppositely directed loop-seizing beak and loop-discharging tail with their points circumferentially spaced apart, and a stationary thread-case journaled in said member and provided with a loop-guard overhanging the paths of movement of said beak and tail and terminating in a lateral discharge-finger, of a stationary loop-controller sustained independently of said loop-guard and adjacent and intermediate the ends of said discharge-finger.

19. In a sewing machine, the combination with a loop-seizing member provided with a beak, and a thread-case journaled therein and provided with a loop-guard terminating in a lateral discharge-finger, of a throat-plate having a loop-controlling spur depending therefrom and downwardly inclined relatively to the path of movement of said beak with its extremity adjacent but spaced from the middle portion of said finger intermediate its ends.

20. In a sewing machine, the combination with a loop-seizing member provided with a beak, and a thread-case journaled therein and provided with a loop-guard terminating in a lateral discharge-finger, of a throat-plate having a needle-hole and recessed adjacent the same in its under face to receive the point of said finger and provided with a depending loop-controlling spur downwardly inclined relatively to the path of movement of said beak with its extremity adjacent but spaced from the middle portion of said finger intermediate its ends.

21. In combination in the stitch-forming mechanism of a sewing machine, a primary hook provided with a cast-off incline, a beak, a circumferential channel formed in the wall of said hook and extending into said beak, and a secondary hook provided with a beak which extends into said channel, the beaks of said hooks operating in the making of a stitch to arrest the limb of the loop of needle-thread running from the work at or near the cast-off incline, and to carry the other limb of said loop running from the eye of the needle to the base of the beak of the secondary hook and cast the same around the bobbin-case.

22. In a sewing machine, a stitch-forming mechanism comprising a primary hook provided with a beak, means for carrying a locking thread and a channel formed in its wall the depth of which extends parallel with the axis about which the hook moves, a stop on the beak of the hook for engaging one limb of the needle-thread loop, and an auxiliary hook operating in said channel for engaging the other limb of said loop.

23. In a sewing machine, a stitch-forming mechanism comprising a primary hook having a channel formed in its wall concentric with its axis, and a slot oblique to said axis which passes through the walls of the channel and thereby forms a beak for the hook, a stop operating in connection with the beak for preventing one limb of the needle-thread loop from sliding down the oblique slot, a bobbin-case carried by said hook, and a secondary hook located wholly within the circumference of the primary hook and provided with a beak which operates in said channel to cause the other limb of the loop to slide down the oblique slot.

24. In a sewing machine, a stitch-forming mechanism comprising a hook provided with a channel the depth of which is in a direction at right angles to the plane in which the hook revolves and an oblique slot passing through the walls of said channel by means of which a beak is formed on the hook, a bridge across said oblique slot intermediate the point and the base of the hook, and a secondary hook operating in said channel.

25. In combination in the stitch-forming mechanism of a sewing machine, a primary hook provided with a beak and an adjacent cast-off incline and having a channel formed in its wall the depth of which extends parallel with the axis of the hook, a secondary hook operating in said channel, and a stop on the beak of said primary hook between its point and base for arresting one limb of the loop of needle-thread and thereby causing it to be engaged by said cast-off incline.

26. In a sewing machine, a stitch-forming mechanism comprising a primary hook provided with a beak and a tail and having a channel formed in its wall the depth of which is in the direction of the rotating axis of the hook, an auxiliary hook disposed so its beak is in said channel, and means whereby the loop of needle-thread as it is being discharged passes from the beak of the primary hook upon its tail.

27. In combination in the stitch-forming mechanism of a sewing machine, a primary hook provided with a beak and an oppositely directed tail and having a circumferential channel formed therein, and a part located within the circumference of said hook and provided with a plurality of loop-engaging elements which operate in said channel.

28. In combination in the stitch-forming mechanism of a sewing machine, a primary hook provided with a beak and a tail and with an annular channel entering the same, a secondary hook adapted to operate in said channel, means for causing the loop of thread as it is being discharged to be caught on said tail, and means for controlling the delivery of said loop from said tail which comprise a part operating in said channel.

29. In combination in a stitch-forming mechanism of a sewing machine, a primary hook provided with a beak and a tail and with a circumferential channel formed in its wall, a secondary hook that operates in said channel, a thread-guard which causes the loop of needle-thread to pass from the beak of the primary hook to the tail, a needle-plate, a projection or finger extending from said needle-plate so located that the loop passes from the tail to said projection, and a finger extending upwardly from said guard so located that the loop passes from the same to the said finger and from thence to the work.

30. In a sewing machine, a stitch-forming mechanism comprising a cylindrical member having a channel in its wall and provided with a beak having its point at the periphery and also at the outer end of said member and its throat nearer to the point of the beak than to the opposite end of said member, said member being formed with a cast-off incline also extending to its outer end, a bobbin-case journaled in said member, and an auxiliary hook which operates in said channel.

31. A sewing machine loop-taker comprising a rotary member provided with a loop-seizing beak and a thread-case journaled therein, means being provided whereby in the initial quadrant of rotation of said member a loop seized by said beak is engaged intermediate the ends of the thread-case and oppositely distended to the extreme ends of the thread-case, preparatory to being cast about the latter by continued movement of said beak.

32. A sewing machine loop-taker comprising a cup-shaped loop-seizing member constructed with a thread-cavity and with a beak having a throat in the forward portion of said member and with an annular channel in its wall extending through said beak, means being provided between the ends of and wholly exterior to the periphery of said member for deflecting an outer limb of a thread-loop from said throat over the forward end of such member, and means restrained against rotation with said member and entering said channel therein for distending the inner limb of said loop over the rearward end of said thread-cavity.

33. A sewing machine loop-taker comprising a cup-shaped loop-seizing member constructed with a thread-cavity having an annular thread-case bearing adjacent its forward end and a beak crossing said bearing and having its point and throat closely adjacent to and at opposite sides of said bearing, means being provided upon the exterior of said member for deflecting a limb of a thread-loop engaged by said throat over the forward end of said member, and means disposed within the periphery of said member for distending the other limb of said loop backwardly to the rear of said cavity.

34. In a sewing machine, the combination with a loop-seizing member constructed with a beak, of a thread-case embraced by said member and provided with a loop-guard overhanging the path of movement of said beak upon the cast-off side of the thread-case.

35. In a sewing machine, the combination with a loop-seizing member constructed with a beak, and a thread-case embraced by said member and provided with a loop-guard overhanging the path of movement of said beak upon the cast-off side of the thread-case, of a stationary loop-controller sustained independently of and adjacent an extremity of said loop-guard and coöperating therewith in the discharge of loops from said guard.

36. In a sewing machine loop-taker, the combination with a rotary loop-seizing member formed with an annular bearing, of a thread-case formed adjacent its forward end with a peripheral flange fitted to said bearing and with a loop-guard extending laterally beyond the periphery of said member upon the side upon which the thread-loops are cast off by the latter, said thread-case sustaining upon its opposite end a loop-distending hook coöperating with said member in the casting of the thread-loops around the thread-case.

37. In a sewing machine loop-taker, the combination with a rotary loop-seizing member formed with an annular bearing, of a thread-case journaled in said bearing and provided upon the side upon which the thread-loops are cast off by said member with a loop-guard extending forwardly of the outer end and laterally beyond the periphery of said loop-seizing member, and a tension-spring mounted upon said loop-guard and exposed at the outer side thereof.

38. In a sewing machine loop-taker, the combination with a rotary loop-seizing member formed with a beak and with a thread-cavity having an annular bearing, of a thread-case journaled in said bearing and provided upon the side from which the beak moves in seizing a thread-loop with a loop-guard extending laterally beyond the periphery of said member and terminating in a substantially radial discharge-finger adjacent loop-seizing position.

39. In a sewing machine loop-taker, the combination with a rotary loop-seizing member formed with a beak and with a thread-cavity having an annular bearing, of a thread-case journaled in said bearing and provided upon the side from which the beak moves in seizing a thread-loop with a loop-guard comprising a segmental plate secured to but spaced from the wall of the thread-case and provided with an aperture, and a tension-spring secured upon said loop-guard and having a portion extending through said aperture of the loop-guard for engagement with the thread-case.

40. In a sewing machine loop-taker, the combination with a rotary loop-seizing member formed with a beak and with a thread-cavity having an annular bearing, of a thread-case journaled in said bearing and provided upon the side from which the beak moves in seizing a thread-loop with a loop-guard comprising a segmental plate secured to but spaced from the wall of the thread-case and provided with an aperture and with transversely notched studs at opposite sides of said aperture upon its inner face for directing the thread across said aperture, and a tension-spring secured upon said loop-guard and having a portion extending through said aperture of the loop-guard for engagement with the thread-case.

41. In a sewing machine loop-taker, the combination with a rotary loop-seizing member formed with a beak and with a thread-cavity having an annular bearing, of a thread-case formed with a peripheral flange fitted to said bearing and provided with a segmental lubricant holding recess having a peripheral distributing slit leading to said bearing.

42. In a sewing machine loop-taker, the combination with a rotary loop-seizing member formed with a beak and with a thread-cavity having an annular bearing, of a thread-case constructed with a cylindrical side wall having a thread-slit extending from the outer end toward the bottom thereof and provided with a peripheral flange crossing said thread-slit and fitted to said bearing and formed with a transverse thread-clearance aperture adjacent the thread-case wall at said thread slit.

43. In a sewing machine, a stitch-forming mechanism comprising a revolving hook provided with a bobbin-case, a loop-guard-spring mounted upon the bobbin-case, and a bobbin-thread tension attached to the loop-guard.

44. In a sewing machine, a stitch-forming mechanism comprising a rotary hook provided with a bobbin-case, a loop-guard attached to said bobbin-case, a passage being provided for the bobbin-thread intermediate the bobbin-case and the loop-guard, means for guiding the bobbin-thread along a predetermined way to the work, an opening through the loop-guard, and a tension-spring attached to the loop-guard operating through said opening to engage the bobbin-thread.

45. In a sewing machine, a stitch-forming mechanism comprising a rotary hook, a bobbin-case journaled therein and provided with an oblique slot, a loop-guard attached to the bobbin-case which extends over said slot, and means in combination with the loop-guard for retaining the bobbin-thread in the slot and permitting it to move along the slot as the thread unwinds from one to the other side of the bobbin.

46. In a sewing machine, a stitch-forming mechanism comprising a rotary hook, a bobbin-case journaled therein and formed with an oblique slot, a loop-guard attached to said bobbin-case which extends over said slot, a downwardly projecting stud carried by the loop-guard and having a slot in its free end, means for guiding the bobbin-thread to said slot in the free end of said stud as the bobbin-case is being threaded, and means for retaining the thread in said slot.

47. In a sewing machine, a stitch-forming mechanism comprising a hook which rotates about a horizontal axis in a direction toward the back of the machine, a bobbin-case carried by said hook and formed with an oblique slot which constitutes a part of the means by which the case is threaded, said slot located in the part of the case which extends from its axis toward the front of the machine, and means for retaining the bobbin-thread in said slot and guiding it therefrom to the work.

48. In a sewing machine, a stitch-forming mechanism comprising a hook which rotates about a horizontal axis, a thread-case carried by said hook and provided with a peripheral portion extending forwardly of the hook, and means carried by said forwardly extending portion of the thread-case whereby the latter may be threaded without removal from the hook.

49. In a sewing machine, a stitch-forming mechanism comprising a primary hook provided with a channel formed in its wall, a bobbin-case carried by said hook, a secondary hook carried by the bobbin-case and operating in said channel, a segmental loop-guard carried by the bobbin-case which has a laterally extending flange, and a finger or part extending from said loop-guard to the under side of the throat-plate near the needle-passage.

50. In a sewing machine loop-taker, the combination with a rotary loop-seizing member formed with an annular bearing, of a thread-case journaled in said bearing and provided with a forwardly extending loop-guard having a loop-absorbing flange extending outwardly therefrom, away from the axis of the loop-seizing member, and beyond the periphery of said member.

51. In a sewing machine loop-taker, the combination with a rotary loop-seizing member formed with a beak and with a thread cavity having an annular bearing, of a substantially cylindrical thread-case journaled in said bearing, a loop-guard sustained by said thread-case and formed with a forwardly extending segmental portion corresponding substantially in curvature with the wall of said cylindrical thread-case.

In testimony whereof, I have signed my name to this specification, in the presence of two subscribing witnesses.

WILLIAM N. PARKES.

Witnesses:
  HENRY J. MILLER,
  H. A. KORNEMANN, Jr.